US011797527B2

(12) United States Patent
Mavrommatis et al.

(10) Patent No.: US 11,797,527 B2
(45) Date of Patent: *Oct. 24, 2023

(54) REAL TIME FAULT TOLERANT STATEFUL FEATURIZATION

(71) Applicant: INTUIT INC., Mountain View, CA (US)

(72) Inventors: Andreas Mavrommatis, Edmonton (CA); Pankaj Rastogi, Fremont, CA (US); Sumanth Venkatasubbaiah, Mountain View, CA (US); Qingbo Hu, Burlingame, CA (US); Karthik Prakash, Milpitas, CA (US); Nicholas Jeffrey Hoh, Mountain View, CA (US); Frank Wisniewski, San Francisco, CA (US); Abhishek Jain, Mountain View, CA (US); Caio Vinicius Soares, Redwood City, CA (US); Yuwen Wu, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,238

(22) Filed: Sep. 26, 2022

(65) Prior Publication Data

US 2023/0018388 A1    Jan. 19, 2023

Related U.S. Application Data

(63) Continuation of application No. 16/888,234, filed on May 29, 2020, now Pat. No. 11,487,751.

(51) Int. Cl.
*G06F 16/23* (2019.01)
*G06N 20/00* (2019.01)
(Continued)

(52) U.S. Cl.
CPC .......... *G06F 16/2379* (2019.01); *G06F 9/541* (2013.01); *G06N 5/02* (2013.01); *G06N 20/00* (2019.01)

(58) Field of Classification Search
CPC ...... G06F 16/2379; G06F 9/541; G06F 17/18; G06F 16/254; G06N 20/00; G06N 5/02; G06N 5/04; H04N 19/50
(Continued)

(56) References Cited

U.S. PATENT DOCUMENTS

2010/0332490 A1* 12/2010 Bauer .................... G06Q 10/06
707/769
2012/0131139 A1    5/2012 Siripurapu et al.
(Continued)

OTHER PUBLICATIONS

Blog, Thoughts from the red planet, "How to beat the CAP theorem," Oct. 13, 2011, <http://nathanmarz.com/blog/how-to-beat-the-cap-theorem.html>, 23 pages.
(Continued)

*Primary Examiner* — Evan Aspinwall
(74) *Attorney, Agent, or Firm* — Patterson + Sheridan, LLP

(57) ABSTRACT

Certain aspects of the present disclosure provide techniques for operation of a feature management platform. A feature management platform is an end-to-end platform developed to manage the full lifecycle of data features. For example, to create a stateful feature, the feature management platform can receive a processing artifact from a computing device. The processing artifact defines the stateful feature, including the data source to retrieve event data from, when to retrieve the event data, the type of transform to apply, etc. Based on the processing artifact, the feature management system generates a processing job (e.g., the API defines a pipeline), which when initiated generates a vector that encapsulates the stateful feature. The vector is transmitted to the computing
(Continued)

device that locally hosts a model, which generates a prediction that is transmitted to the feature management platform. Subsequently, the predication and stateful feature can be transmitted to other computing devices.

20 Claims, 9 Drawing Sheets

(51) Int. Cl.
*G06N 5/02* (2023.01)
*G06F 9/54* (2006.01)

(58) Field of Classification Search
USPC .......................................................... 707/703
See application file for complete search history.

(56) References Cited

U.S. PATENT DOCUMENTS

| | | | |
|---|---|---|---|
| 2018/0288165 A1 | 10/2018 | Fransazov et al. | |
| 2019/0188065 A1 | 6/2019 | Anghel et al. | |
| 2019/0220297 A1* | 7/2019 | Rao | G06F 9/45558 |
| 2020/0076842 A1 | 3/2020 | Zhou et al. | |
| 2020/0364585 A1 | 11/2020 | Chandrashekar et al. | |
| 2021/0133186 A1* | 5/2021 | Jalali | G06F 16/273 |

OTHER PUBLICATIONS

Jon Boulineau, "Lambda Architecture," May 21, 2018, <https://jonboulineau.me/blog/architecture/lambda-architecture>, 3 pages.
Jay Kreps, "Questioning the Lambda Architecture—O'Reilly," Jul. 2, 2014, <https://www.oreilly.com/radar/questioning-the lambda-architecture/>, 10 pages.
Microsoft Docs, "Big Data Architectures," Feb. 12, 2018, <https://docs.microsoft.com/en-us/azure/architecture/data-guide/big-data/>, 9 pages.
Apache Atlas—Data Governance and Metadata framework for Hadoop, http://atlas.apache.org/#/ <http://atlas.apache.prg/>, 3 pages.
Apache Spark™, Unified Analytics Engine for Big Data, <https://spark.apache.org/>, 3 pages.
Protocol Buffers, <https://developers.google.com/protocol-buffers>, 1 page.
Tim Sell et al., "Google Cloud, Introducing Feast: an open source feature for machine learning," <https://cloud.google.com/blog/products/ai-machine-learning/introducing-feast-an-open-source-feature-store-for-machine-learning>, 5 pages.
Introduction to Feast, <https://docs.feast.dev/>, 142 pages.
Jeremy Hermann and Mike Del Balso, "Meet Michelangelo: Uber's Machine Learning Platform," <https://eng.uber.com/michelangelo-machine-learning-platform/>, 25 pages.
Jeremy Hermann and Mike Del Balso, "Scaling Machine Learning at Uber with Michaelangelo," <https://eng.uber.com/scaling-michelangelo/>, , 28 pages.
Fredrik Rönnlund, Michaelangelo—Machine Learning Infrastructure at Uber, <https://valohai.com/blog/an-interview-with-former-product-manager-for-ubers-michelangelo-mike-del-balso/>, 5 pages.
Varant Zanoyan, "Zipline—Airbnb's ML Data Management Framework," <https://conferences.oreilly.com/strata/strata-ny-2018/cdn.oreillystatic.com/en/assets/1/event/278/Zipline_%20Airbnb_s%20data%20management%20platform%20for%20machine%20learning%20Presentation.pdf>, 52 pages.
Nikhil Simha and Andrew Hoh, Zipline—Airbnb's ML Data Management Framework, published Jun. 12, 2018, <https://www.slideshare.net/databricks/zipline-airbnbs-machine-learning-data-management-platform-with-nikhil-simha-and-andrew-hoh>, 30 pages.
AI Research, Introducing FBLearner Flow: Facebook's AI Backbone, May 9, 2016, <https://engineering.fb.com/ml-applications/introducing-fblearner-flow-facebook-s-ai-backbone/>, 11 pages.
GitHub—logical clocks/hopsworks: Hopworks—Data-Intensive AI Platform with a Feature Store, <https://github.com/logicalclocks/hopsworks>, 13 pages.
Kafka Streams, Streams Architecture, <https://docs.confluent.io/current/streams/architecture.html>, 17 pages.
A Deep Dive into Stateful Stream Processing in Structured Streaming Tathagata Das (Databricks), <https://docs.confluent.io/current/streams/architecture.html>, 4 pages.
Tathagata Das, State Store for Streaming Aggregations, Mar. 8, 2016 (updated draft) https://docs.google.com/document/d/1-ncawFx8JS5Zyfq1HAEGBx56RDet9wfVp_hDM8ZL254/edit#heading=h.c2fdg2a4vmih <https://docs.google.com/document/d/1-ncawFx8JS5Zyfq1HAEGBx56RDet9wfVp_hDM8ZL254/edit>, 8 pages.
Apache Storm, Storm State Management, <https://storm.apache.org/releases/2.0.0/State-checkpointing.html>, 8 pages.
Samza, Apache Samza, A distributed stream processing framework, <https://storm.apache.org/releases/2.0.0/State-checkpointing.html>, 4 pages.
Flink, Apache Flink®—Stateful Computations over Data Streams, <https://storm.apache.org/releases/2.0.0/State-checkpointing.html>, 4 pages.
What is Metaflow—Metaflow <https://docs.metaflow.org/introduction/what-is-metaflow>, 8 pages.

* cited by examiner

```
|feature - configs = {
  geoip - features = {

#Custom config needed by this feature
    geo-ip-database = "/geo.db"
    class-name = "com.intuit.ai.feature.GeoIP"
    timestamp-field - "timestamp"
    source-dataset-name - "clickstream-v1"

# Config needed by the feature management api
    "feature-list": [
      {
        "feature-name" : "test",
        "version" : "1.0",
        "description" : "This is an example feature",
        "source-id" : "rss",
        "source-version" : "1.62.0",
        "tags" : ["test"],
        "authors" : ["jdoe" , "jsmith"],
        "owners" : ["jdoe", "jsmith", "ajones"],
        "watchers" : ["jdoe", "jsmith"],
        "ttl-in-milli" : 1000,
        "classification" : "PUBLIC",
        "feature-value-data-type" : "Int",
        "is-nullable" : true,
        "start-execution" : true,
        "is-test" : true,
        "entity-key" : "ip",
        "entity-value-column" : "ip",
        "feature-value-column" : "latitude"
        "feature-space-name" : "feature-space",
        "calculator" : "com.intuit.ai.feature.GeoIP",
        "is-aggregate" : false,
        "governance-id-mappings" : {"user-id" : "userId"},
        "governance-exempted" : false
      },
    }
```

REAL TIME FAULT TOLERANT STATEFUL FEATURIZATION

CROSS-REFERENCE TO RELATED APPLICATIONS

This application is a continuation of co-pending U.S. patent application Ser. No. 16/888,234, filed May 29, 2020, the contents of which are incorporated herein by reference in their entirety.

INTRODUCTION

Aspects of the present disclosure relate to the operation of a feature management platform configured to manage the full lifecycle of feature data. In particular, the present disclosure relates to the management of stateful features by a feature management platform.

BACKGROUND

Within the field of data science and analytics, artificial intelligence and machine learning are rapidly growing. More and more entities and organizations are adopting and implementing such technologies. As the field (and popularity) of artificial intelligence and machine learning grows and further develops, so too does the technology for supporting artificial intelligence and machine learning. One such technology focuses on data processing. Generally, large amounts of feature data are needed to train artificial intelligence and machine learning models. Such data can be used both to train models and to generate predictions for specific use cases based on the trained models.

In order to implement data processing at the scale and level feasible for artificial intelligence and machine learning models, a significant amount of resources is often devoted to the collection, transformation, and storage of data. Not only that, the time and costs associated with developing data processing techniques for artificial intelligence and machine learning models can be high. There is also the risk of generating duplicate feature data, when implementing data processing techniques, resulting in more resources being consumed then necessary. Further, there is also a dependence on data engineers when attempting to manage the full lifecycle of feature data. In such instances, the dependence on data engineers also increases the time with which it takes to provide useful feature data. Additionally, conventional methods of data processing are time-intensive and often lack the latest feature data, preventing timely generation of predictions by artificial intelligence and machine learning models, such as for fraud detection, user support, and so forth. As a result, organizations and entities implementing artificial intelligence and machine learning models may base decisions on low quality predictions (e.g., predictions based on old feature data).

Conventional methods attempt to address the shortcomings (as described above) of data processing of feature data. However, conventional methods are often standalone ad hoc solutions that lack governance, model integration, and flexibility to create feature data for real-time and batch aggregations. Additional limitations of conventional methods include a lack of reusability and shareability of the feature data as well as the failure of the conventional methods to manage the entire lifecycle of feature data in a reliable, scalable, resilient, and easily useable manner.

As such, a solution is needed that can overcome the shortcomings of the conventional methods to manage the complete lifecycle of feature data in a scalable and reusable manner.

BRIEF SUMMARY

Certain embodiments provide a method for a feature management platform that operates to manage feature data (e.g., stateful features). The method generally includes receiving, from a computing device, a processing artifact defining a stateful feature including: a data source to retrieve event data, and a transform to apply to the event data from the data source. The method further includes generating, based on the processing artifact, a processing job. The method further includes initiating the processing job, wherein the processing job includes retrieving the event data from the data source; applying the transform to the event data to generate a set of feature values; aggregating the set of feature values in an external cache; upon aggregating the set of feature values in the external cache: retrieving the aggregated set of feature values in the external cache; generating a stateful feature based on the aggregated set of feature values; encapsulating the stateful feature within a vector; and providing the vector to the computing device that hosts a model. The method further includes receiving, from the computing device, a prediction generated by the model hosted on the computing device. The method further includes transmitting the prediction to a second computing device.

Other embodiments provide systems for a feature management platform that operate to receive and provide feature data (e.g., stateful features) and/or predictions. Additionally, other embodiments provide non-transitory computer-readable storage mediums comprising instructions for a feature management platform that operates to manage feature data and/or predictions.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 depicts an example configuration file of the feature management platform, according to an embodiment.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
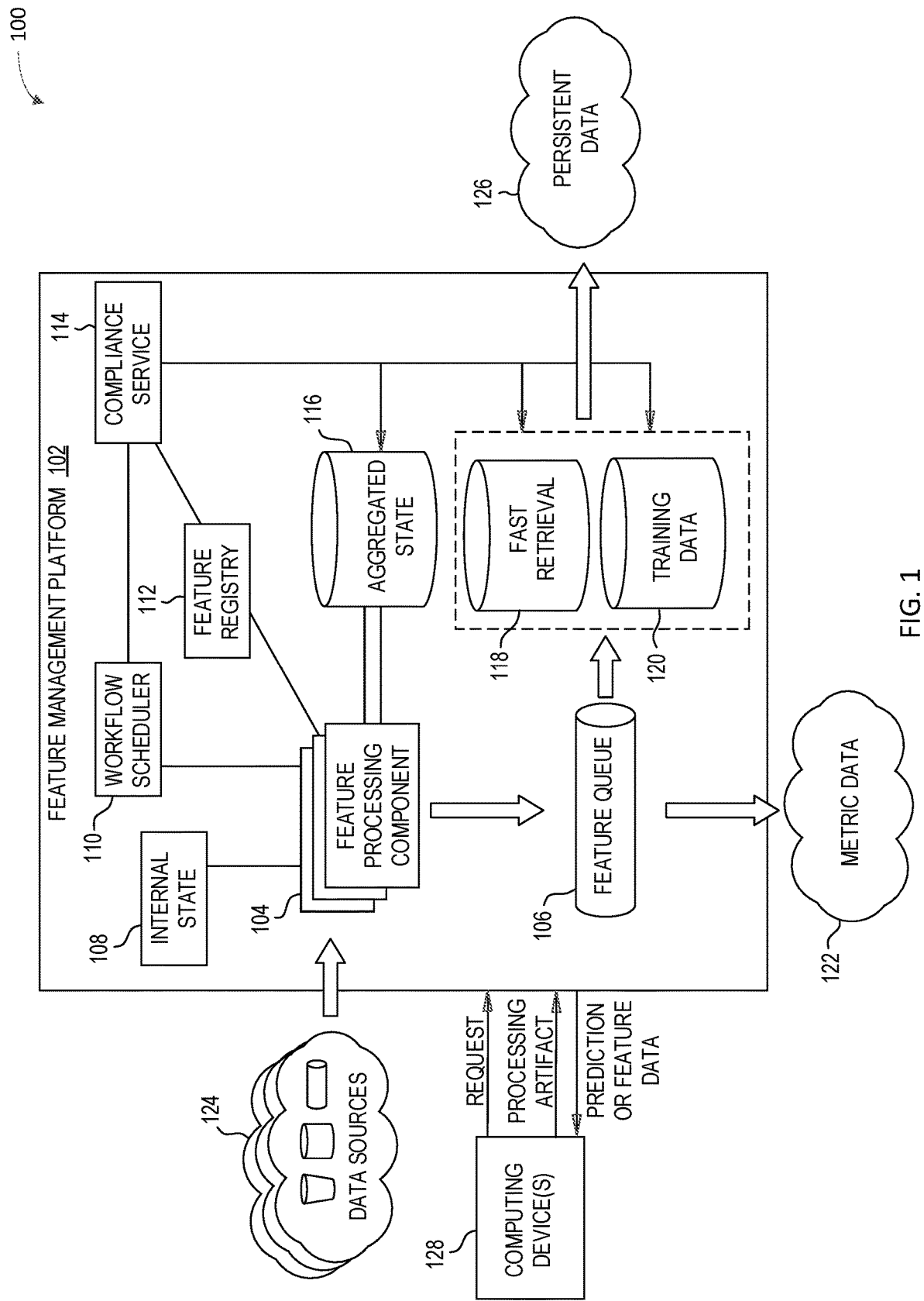
FIG. 1 depicts an example feature management platform, according to an embodiment.

Aspects of the present disclosure provide apparatuses, methods, processing systems, and non-transitory computer readable mediums for the operation of a feature management platform, which is an end-to-end platform for managing the full lifecycle of feature data (e.g., discovery, creation, use, governing, and deployment of feature data), including stateful features and stateless features.

Organizations and entities that depend on feature data processing for artificial intelligence and/or machine learning (AI/ML) models can implement a feature management platform. Due to the pluggability and multi-tenancy nature of the feature management platform, multiple types of computing devices (or client devices) can connect to (or "plug" into) the feature management platform for discovering, creating, sharing, re-using, etc., feature data, including stateful features.

Generally, stateful features are a type of feature data that are calculated using aggregation operations (e.g., count, count distinct, sum, min, max, etc.) over a period of time. Feature data can include event data that is featurized, such as geographic lookups (e.g., based on IP addresses, zip codes, and other types of geographic identifying data), counts of user activity (e.g., clicks on a link, visits to a web site, and other types of countable user activity), and other types of featurized data based on event data collected by an organization. The event data can include raw data gathered through interactions and operations of the organization. For example, an organization that provides user support of products and/or services offered by that organization can collect information (e.g., event data) such as IP addresses of users accessing online user support, number of times a user contacts user support (e.g., via phone, email, etc.), and so forth.

Such event data can be featurized and used to generate stateful features by the feature management platform. The feature data (including stateful features) can be retrieved (e.g., via computing devices) from the feature management platform to train and implement models to generate predictions that can assist the organization in making operational decisions. Further, the feature management platform can interact with computing devices to receive and distribute predictions generated to other models and/or computing devices, which in turn can reduce the consumption of resources by an organization including computing resources, time, money, etc.

The feature management platform provides the tooling and framework for managing data transformations, which in turn allow for creation of feature data for AL/ML, models. The feature management platform includes components that enable the sharing and reusability of feature data to other models as well as reducing data corruption and data duplication. Further, the feature management platform can automate aspects of data processing such that dependence on data engineers is reduced.

As part of managing the full lifecycle of feature data, the feature management platform can create the feature data. In some embodiments, the feature management platform includes an API that allows a computing device to search and discover (e.g., by providing the interface to a computing device) whether a certain feature and/or prediction exists within the feature management platform. For example, the computing device can via a user interface search the feature metadata of a feature registry in the feature management platform to determine whether a feature is stored on a data store of the feature management platform (e.g., a fast retrieval database or a training data database). In cases where the feature management platform does not already include the feature and/or prediction, the feature management platform is capable of creating the feature for and/or providing prediction to the computing device.

In some cases, a stateful feature can already be present in the feature management platform (e.g., the stateful feature can be previously generated). In such instances, a computing device can search the feature registry via a user interface and retrieve the stateful feature (e.g., as one or more feature vectors) from a data store of the feature management platform. In other cases, the stateful feature may not exist in the feature management platform. In such instances, the feature management platform can generate the stateful feature to provide to a computing device.

To generate and manage the full lifecycle of a stateful feature, the feature management platform may include an API that defines a pipeline for generating the stateful feature (e.g., generate a processing job) based on a processing artifact received from a computing device. The feature management platform can receive a processing artifact that can include a configuration file and/or code fragments to define the stateful feature. The definition of the stateful feature includes, at least, a corresponding data source, a transform, and an aggregation operation. For example, the transform can refer to the type of feature calculation for the feature management platform to perform on data from the data source. The feature management platform generates, based on the processing artifact, a processing job for the feature management platform to perform. For example, the processing job is configured to retrieve event data from a data source. In some cases, the event data can be retrieved from a data source at a scheduled time. In other cases, the event data can be retrieved as a continuous data flow.

In some cases, the configuration file can include which data source(s) to retrieve event data from, what type of transforms (or calculations) to perform on the event data, how far back and/or how long to retrieve event data, where to provide the feature vectors, etc. In such cases, the API of the feature management platform can retrieve such information from the configuration file to define the pipeline for generating the stateful feature.

In some cases, code fragments received by the feature management platform can include functional data that can include data operations for generating feature data (e.g., aggregations, joins, and other types of data operations). For example, a computing device can provide (or transmit) the code fragment(s) along with the configuration file. In another example, the code fragment may have been provided to the feature management platform prior to the configuration file and can be re-used. In such cases, the processing artifact received from a computing device can include just the configuration file, and the feature management platform can use code fragments previously provided (e.g., as directed by the configuration file). The configuration file can be an object notation or data serialization configuration file format, such as a JSON file, a HOCON file, an XML file, a YAML file, a ZIP file, a JAR file, and so forth.

Subsequent to generating the processing job, the processing job is initiated in order to retrieve event data from the data source (e.g., as defined in the processing artifact) and generate a vector that represents a stateful feature. For example, the feature management platform can retrieve event data from a data source(s) and apply the transform(s) to the event data per the processing artifact. A set of features can then be aggregated and stored in a cache (e.g., a cache external to the pipeline in the feature management platform). The aggregated features can be retrieved from the external cache, and the pipeline can generate a stateful feature. The stateful feature can be provided as a vector or tensor (e.g., via a message) to one or more computing devices. For example, the vector can be stored in the feature management platform and be made available to other computing devices connected to the feature management platform for the purpose of allowing those computing devices to access and use the vector without having to duplicate the work or waste resources. In some cases, the vector can be stored in a feature store such as a fast retrieval database or a training data database, and the corresponding metadata can be stored in a feature registry.

In some cases, a computing device can use the vector for training and creating a model on the computing device. In other cases, the vector is used by a model stored locally on the computing device as part of a use case to generate a prediction. In such cases, the feature management platform can receive a transmission from the computing device of the prediction generated by the model. The prediction can be stored in the feature management platform and can be transmitted to other computing devices, including downstream clients. Further, the prediction(s) can be input to other models hosted local on other computing devices connected to the feature management platform.

Such a feature management platform capable of managing the full life cycle of stateful feature data minimizes dependency on data engineering (which can be resource intensive and costly). Additionally, the feature management platform reduces the time for creation, modification, deployment, and use of stateful features because the feature management platform is a consolidated platform of components that can manage the entire lifecycle of stateful feature data. Through automation of data processing as well as components of the feature management platform (e.g., feature registry, feature queue, etc.), the feature management platform can allow a plurality of different types of computing devices to connect to, access, and interact with the feature management platform. Further, with the connection to the feature management platform, the computing devices can discover, create, implement, share, re-use, etc., stateful feature data without the risk of feature data duplication and expending unnecessary resources. For example, without the feature management platform, data engineers may generate non-real time feature data, including duplicate instances of feature data, that would not be reusable.

Example Feature Management Platform

FIG. 1 depicts an example framework 100 of a feature management platform 102. The feature management platform 102 is a processing framework that supports the complete lifecycle management of feature data (e.g., stateful and stateless feature data). For example, the feature management platform 102 supports the creation, discovery, shareability, re-usability, etc. of stateful feature data (as well as stateless feature data) among a plurality of computing devices that connect to the feature management platform 102.

In one embodiment, the processing framework of the feature management platform 102 supports stateful feature calculations, a feature queue, and various attached storages. For stateful feature calculation, the feature management platform 102 is able to keep track of a feature data, so that the feature management platform 102 can provide stateful feature data generated based on a stateful feature calculation to one or more computing devices.

The feature management platform 102 includes (or is associated with) a set of components. For example, one or more components of the feature management platform 102 can be components that democratize (or e.g., make accessible) the feature management platform 102 infrastructure. Other components of the set of components of the feature management platform 102 "face" or interact directly with computing devices. Some components of the feature management platform 102 can be shared components, external services, data sources, or integration points. Due to the integration of all of the components, the feature management platform 102 is able to provide stateful feature data to computing devices for AI/ML models hosted thereon and manage the full lifecycle of stateful feature data (e.g., discovery, creation, use, deployment, etc.).

In some cases, a distributed system can implement the feature management platform 102, such that the components of the feature management platform 102 can be located at different network computing devices (e.g., servers).

In one embodiment, the feature management platform 102 includes feature processing component 104, a feature queue 106, an internal state 108, a workflow schedule 110, a feature registry 112, a compliance service 114, an aggregated state 116, a fast retrieval database 118, a training data database 120, metric data 122, data sources 124, and persistent data 126. The feature management platform 102 can interact with a plurality of computing devices 128.

Due to the multi-tenancy of the feature management platform 102, multiple computing devices 128 can connect to, access, and use the feature management platform 102. In some cases, a computing device 128 can submit requests for feature data and/or prediction(s). In other cases, a computing device 128 can provide processing artifacts (e.g., a configuration file and/or code fragments). In other cases, the computing device 128 can retrieve feature data and/or predictions from feature management platform 102. For example, the computing device 128 can retrieve a prediction stored by the feature management platform 102 that was generated by another computing device that locally hosts a trained model. In another example, the computing device 128 can retrieve feature data from the feature management platform as a feature vector message. Computing devices 128 can include a computer, laptop, tablet, smartphone, a virtual machine, container, or other computing device with the same or similar capabilities (e.g., that includes training and implementing models, serving predictions to applications running on such computing device, and interacting with the feature management platform).

The feature processing component 104 of the feature management platform 102 can include an API for implementing transforms on event data (e.g., streaming or batch data) in order to generate feature data (or feature values) including stateful features. Event data can include raw data from data sources associated with the feature management platform 102. For example, in the context of an organization that provides service(s) and/or product(s), the raw data can include user information (e.g., identifiers), IP addresses, counts of user action (e.g., clicks, log in attempts, etc.), timestamps, geolocation, transaction amounts, and other types of data collected by the organization.

In some cases, the feature management platform 102 can receive a processing artifact from a computing device 128. For example, the computing device 128 can be associated with an organization that is associated with (and can connect to) the feature management platform 102. Based on the processing artifact, the feature processing component 104 can generate and initiate a processing job that generates feature data, which are aggregated according to an aggregation time window and aggregation logic to generate a stateful feature. In some cases, the aggregation time window and the aggregation logic can be included in the processing artifact and/or provided to feature processing component 104 via a user interface from the API of the feature processing component 104.

The processing artifact can include a definition of the stateful feature, including what data sources 124 to retrieve event data from, what transform(s) to apply to the event data, how far back and/or how long to retrieve event data, where to provide the feature vectors, etc. In such cases, the feature processing component 104 can retrieve event data from a data source 124 and apply one or more transformations to the event data to generate feature data for a period of time, based on the feature defined in the processing artifact.

The data sources 124 can include sources of batch and streaming data that connect to the feature management platform 102. In some cases, the event data from data sources 124 can be either streaming data or batch data collected by the organization(s) associated with the feature management platform 102. In order for the feature processing component 104 of the feature management platform 102 to transform event data into feature data or values (e.g., in a feature vector), event data is retrieved from data sources 124 that are exposed (or connected via, e.g., APACHE SPARK®) to the feature management platform 102. For example, the event data can be retrieved via the API of the feature processing component 104. In some cases, the data sources 124 can include KAFKA® topics (e.g., for streaming data). In other cases, the data sources 124 can include Hive tables or S3 buckets (e.g., for batch data by the feature management platform 102).

The feature processing component 104 of the feature management platform 102 can be supported by analytics engines (e.g., APACHE SPARK™) capable of data transformation of both streaming and batch data (e.g., APACHE KAFKA® topic(s)), APACHE HIVE™ tables, Amazon S3 buckets). The feature processing component 104 can implement transforms by leveraging the API. In some cases, the API can be built on top of APACHE SPARK™. The API of the feature processing component 104 can support, for example, Scala, SQL, and Python as interface languages as well as other types of interface languages compatible with the API.

One aspect of the feature processing component 104 includes a pipeline (as described in FIG. 3) that provides the feature processing component 104 of the feature management platform 102 the ability to process event data in either streaming or batch mode to generate feature data. Further, based on the pipeline, the feature processing component 104 can backfill feature values and allow users of the feature management platform 102 to control the featurization logic and aggregation logic (e.g., by accepting processing artifacts from computing devices). In some cases, the feature processing component 104 can include a pipeline for each computing device 128 connected to the feature management platform 102 as part of multi-tenancy support of the feature management platform 102, providing access and service to more than one computing device 128.

Upon the feature processing component 104 generating and initiating a processing job, the resulting output of the feature processing component 104 is a set of feature values (e.g., feature data). In some cases, the feature data may be encapsulated as a vector (or a set of feature vectors or tensors) and published on a feature queue 106. In other cases, the stateful feature can be generated based on the feature values. For example, the feature values can be stored in an aggregated state 116 (e.g., a cache external to the feature processing component 104) and retrieved by the feature processing component 104 when an aggregation time window is complete. Upon retrieving the feature values, the feature processing component 104 can implement aggregation logic to generate the stateful feature. Once generated, the stateful feature can be encapsulated within a vector, tensor, or the like.

The feature queue 106 of the feature management platform 102 may comprise a write path to a multi-storage persistent layer of the feature management platform 102 (e.g., a fast retrieval database 118, a training data database 120, or other type of database). Once feature vectors are generated by the feature processing component 104, the feature vectors can be published on the feature queue 106 to provide to computing device(s).

Additionally, the feature queue 106 is a queue that can protect the multi-storage persistent layer of the feature management platform 102 from "bad" code as a security measure to prevent data corruption. The feature queue 106 can act as an intermediary that can provide isolation of components in the feature management platform 102 that face the computing device by decoupling and abstracting featurization code (e.g., code fragment in the processing artifact) from storage. Further, the abstraction of the feature queue 106 is for both streaming and batch mode operations of the feature management platform 102.

Additionally, the feature queue 106 can include feature spaces, which can be "spaces" between published vector data. The feature queue 106 can separate each pipeline of feature processing from a computing device (e.g., to monitor and create alerts for feature(s)). In doing so, the feature queue 106 can allow for use case isolation and multi-tenancy support on the feature management platform 102.

For example, as more than one computing device 128 can connect to the feature management platform 102, the feature queue 106 can provide separation for the result of each processing job for each computing device. The feature queue 106 can provide feature parity for all data points across all storage options and a single monitoring point for data quality, drift, and anomalies as well as pipeline integrity.

The internal state 108 is a shared component of the feature management platform 102. In some cases, the internal state 108 is a service and/or database that stores information regarding the state of all applications and/or components running on the feature management platform 102. For example, data stored in the internal state 108 can include offsets, data markers, data processing and/or privacy regulations (e.g., California Consumer Privacy Act (CCPA)). The internal state 108 also includes a copy of feature metadata (or meta information) from the feature registry 112 and specific configuration items that assist in the operation of the feature management platform 102. Such storage of feature metadata and specific configuration items within the internal state 108 can be retrieved from and pushed to by the feature processing component 104 of the feature management platform 102 without any user intervention. For example, a copy of configuration information can be retrieved from the configuration file and synced to the feature registry, which can provide a user interface (e.g., via the API) to a computing device for querying information regarding features.

The workflow scheduler 110 can schedule when feature processing jobs (e.g., a processing job, a feature logic calculation, an aggregation operation, etc.) can run in the feature management platform 102. In some cases, the workflow scheduler 110 can be a tool, data manager, or service capable of executing processing jobs. For example, a workflow scheduler 110 can be based on Jenkins, APACHE AIRFLOWʊ, ARGO EVENTS™, or other similar tool, manager, or service capable of scheduling the workflow of processing jobs.

The feature registry 112 component is a central registry of the feature management platform 102. The feature processing component 104 of the feature management platform 102 can parse configuration files received from computing devices and register in the feature registry 112 the features generated (as described in the configuration file) by the feature processing component 104, including stateful features. The features registered in the feature registry 112 are discoverable (e.g., based on metadata) and can be consumed by other use cases (e.g., by other computing devices requesting the feature for locally hosted models). For example, to discover a feature, the feature registry 112 can provide a user interface via the API of the feature management platform.

In some embodiments, the feature registry 112 is a feature metastore that can leverage a metadata framework for storing and managing feature data. For example, the feature registry 112 can leverage APACHE ATLAS™ for feature data storage and management. The feature registry 112 can be queried to discover feature computations for reuse that have been previously implemented and registered to the feature metastore.

Further, the feature management platform 102 may be configured to comply with self-service data governance and compliance regulations (e.g., privacy laws) by registering feature data in the feature registry 112 and requiring specific key columns in feature datasets that contain user identifiable data. In some cases, a connected cascade of indexing and delete jobs in compliance with governance and compliance regulations can be triggered automatically (e.g., without user involvement) by the feature management platform 102 to manage the feature data in the feature registry 112 and attached storage layers (e.g., delete data from the fast retrieval database 118, training data database 120, and aggregated state 116).

The compliance service 114 is a component of the feature management platform 102 that is an automated workflow that ensures data is processed according to compliance regulations. For example, the compliance service 114 can monitor and ensure that data is deleted in accordance with privacy laws (e.g., CCPA). The compliance service 114 can generate an audit of data processing for the feature management platform 102. For example, the compliance service 114 can create reverse indices on a given schedule and leverage the reverse indices when performing delete requests and confirming deletion of data. In some cases, the feature management platform 102 can generate a status report of the deleted jobs.

In the instance of deleting data from a feature management platform 102, the delete job can be defined in a workflow and orchestrated by a data manager of the compliance service 114. For example, a computing device can provide a request (e.g., on behalf of a user, entity, organization, etc.) to delete data in accordance with a law or regulation, such as the CCPA. Such request can be received via an API and stored in the internal state 108. Upon reaching the scheduled time for deleting data according to the request, the compliance service 114 can determine all identifiable data per the request and delete the data from data store(s). In some cases, the workflow of the delete job can be defined by services capable of organizing and cleaning data (e.g., AWS GLUE™, KUBERNETES™, etc.).

An aggregated state 116 of the feature management platform 102 can include a collection of feature data based on user-defined functions (e.g., feature calculation logic, aggregation logic, etc.). In this example, the aggregated state 116 is a distributed cache, external to feature processing component 104, which allows the feature management platform 102 to retain data state as aggregated feature data over a period of time (e.g., a number of distinct users per historic IP, a number of logins in a certain time period, etc.). In some cases, the data state can include all interim feature values that support a calculation of an aggregate function. In other cases, the aggregated state can create and hold aggregated values over time per user per feature in order to provide model scorings (e.g., model scorings from AI/ML models).

In some cases, the aggregated state 116 can be reused for multiple features, which adds to the reusable capability of the feature management platform 102. For example, the stateful feature generated based on data from the aggregated state 116 can be requested (as well as the data in the aggregated state 116) by and provided to other computing devices without having to expend additional resources. The stateful feature can be stored in the fast retrieval database 118 and/or the training data database 120, and upon receiving a request for the stateful feature, the feature management platform 102 can provide the requested stateful feature without having to re-generate the feature.

Further, the aggregated state 116 is isolated, which makes such cache independent of application errors and failures as well as infrastructure changes to the feature management platform 102. Also, the implementation of the aggregated state 116 by the feature management platform 102 can result in sub millisecond latency of featurization transaction, which can enable close to real time prediction for AI/ML models that receive the stateful feature (as well as other feature data). In some cases, the aggregated state 116 can endure a throughput of up to 200% more (e.g., 650,000 TPS or more) for a single use case.

The fast retrieval database 118 and the training data database 120 are each a type of feature store and represents a dual storage system for the feature management platform 102. As part of the dual storage system, persistent data 126 is stored within the fast retrieval database 118 and training data database. The persistent data 126 may comprise feature values that are stored for model use cases or training.

For example, the fast retrieval database 118 can include feature data that can be provided to a model hosted locally on a computing device to generate real-time predictions (e.g., for model use cases and/or inferences). The fast retrieval database 118 can store the most recent (or latest) feature data at a low latency. The training data database 120 can include feature data that can be provided to train a model hosted locally on a computing device (e.g., for model training). The training data database 120 can include all of the generated feature data, including previously generated feature data.

In one example, the feature management platform 102 can generate a stateful feature regarding the number of distinct IP addresses up to a given point in time for each user name. To train a supervised machine learning model on a computing device that can generate a label for user name n at some point in time tin the past, the value of the count distinct feature for the user name n at time t can be retrieved from the feature management platform 102. In particular, the training data database 120 can include for each feature and entity, an ordered set of timestamped feature values. Such data is transmitted to the computing device 128 to train the supervised machine learning model. For a prediction or real-time inference, regarding the most recent (or up-to-date) feature value of the IP address for a user name, then such data can be retrieved from the fast retrieval database 118, which includes the latest feature values.

In some cases, the dual storage system can include a scalable database, such as a DYNAMODB™. The persistence layer of the dual storage system can serve recent feature values at low latency. In some cases, the feature values are grouped and/or compressed (e.g., by using Protobuf). Additionally, the dual storage system of the fast retrieval database 118 and the training data database 120 includes "smart updates" that prevent older feature values from being overwritten by new feature values during feature revisions (e.g., that are generated by the feature processing component 104). In some cases, the feature management platform 102 can include other types of data storage, such as a persistent database, for storing persistent data such as timestamp data.

The metric data 122 is generated by transformation of the event data that is related to the pipeline or processing job execution. The metric data 122 can be used to monitor the performance of processing jobs and to understand operation metrics. In some cases, the metric data 122 can be monitored via a monitoring platform (e.g., WAVEFRONT' by VMWare). In other cases, the metric data 122 can be used to create alerts for the feature management platform.

Example Flow Diagram of Stateful Feature Processing

Figure 2:
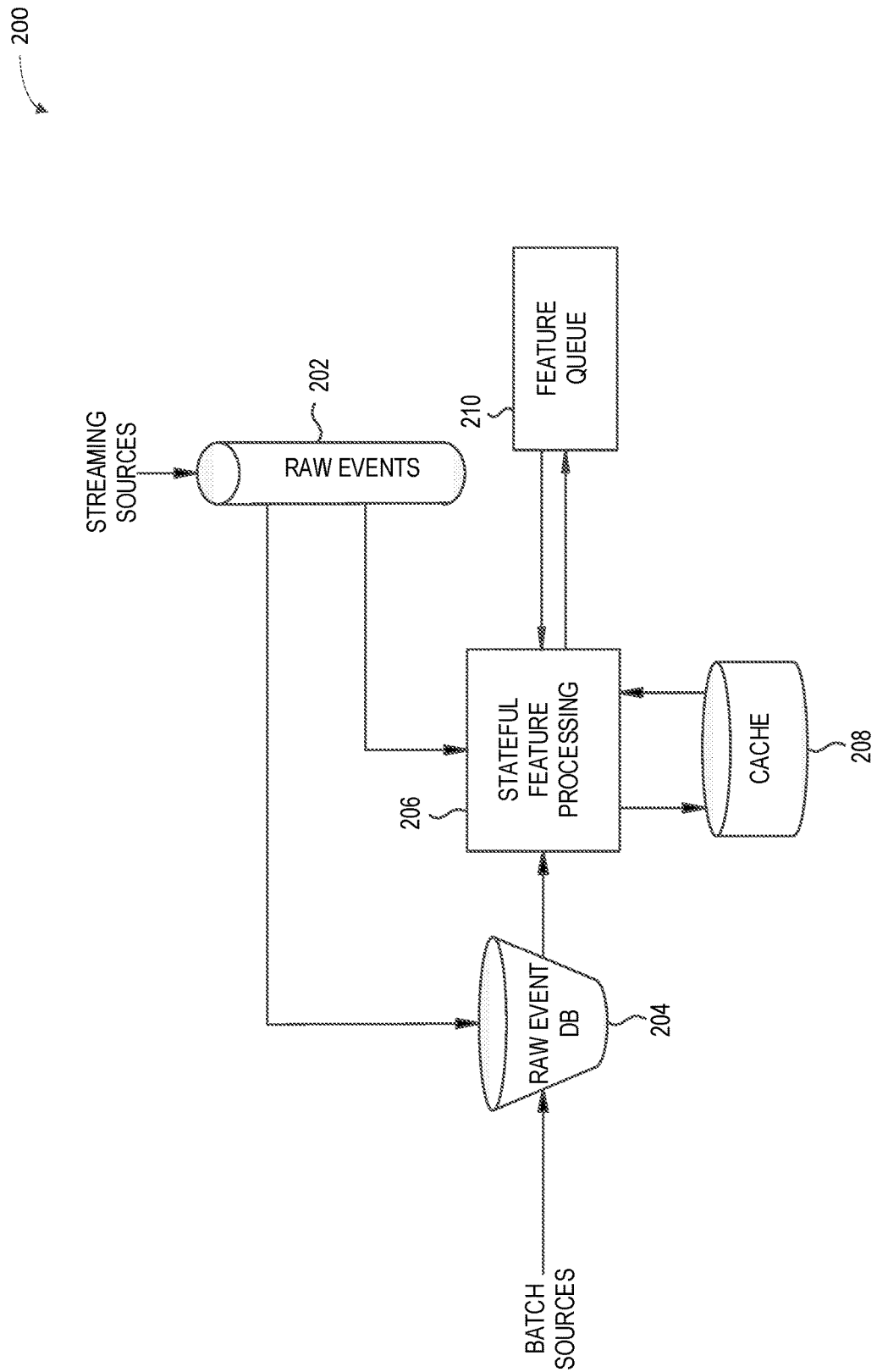
FIG. 2 depicts an example flow diagram of stateful feature processing by the feature management platform, according to an embodiment.

FIG. 2 depicts an example flow diagram 200 of stateful feature processing by the feature management platform. The example flow diagram 200 illustrates how event data (e.g., raw events) from data source(s) are retrieved and processed in the feature management platform, resulting in stateful feature(s).

Prior to retrieving the raw events 202 from data source(s), the feature management platform defines how the stateful feature will be generated by the stateful feature processing 206 component (e.g., feature processing component 104 of FIG. 1), based on a processing artifact from a computing device received by the feature management platform (not depicted). The processing artifact includes from which data source(s) to retrieve raw events 202, the type of transform(s) to implement on the raw events 202, a time period to retrieve raw events 202, etc.

Raw events 202 include event data stored in various data sources that are associated with the feature management platform. For example, an organization that is associated with or implements the feature management platform can collect data through operations and interactions the organization has, for example, with (former, present, and potential) employees, customers, competitors, advertisers, etc. Some examples of raw events 202 collected by an organization can include user information (e.g., identifiers), IP addresses, counts of user action (e.g., clicks, log in attempts, etc.), timestamps, geolocation, transaction amounts, and other types of data collected by the organization.

In some cases, the raw events 202 are retrieved from streaming data source(s). In such cases, the raw events 202 can be provided to the raw event database 204 or to the stateful feature processing 206 component. In other cases, the raw events 202 are retrieved from batch sources. In such cases, the raw events from batch sources can be stored in the raw event database 204.

The raw event database 204 is a database for long-term storage of raw events 202. For example, the raw events 202 retrieved from streaming and/or batch sources can be stored for years in the raw event database 204. Raw events 202 can be stored in the raw event database 204 because, in some cases, the stateful feature can be defined for a period of time that includes a time in the past. As such, the stateful feature processing 206 component can retrieve raw events 202 corresponding to the time in the past for generating the stateful feature.

When the raw events 202 are retrieved by the feature management platform, the raw events 202 can be provided to the stateful feature processing 206 component of the feature management platform. The stateful feature processing 206 component can include feature calculation logic and aggregation logic defined by a processing artifact for generating the stateful feature.

In some cases, the feature management platform can provide via the API of the feature processing component (e.g., stateful feature processing 206 component) a set of user interfaces, which can allow for input data defining the stateful feature. For example, the input data can include a type of transform or feature calculation logic to apply to raw events, a data source from which to retrieve raw event data, a size of a time window for aggregating the features values to generate a stateful feature, how to aggregate the feature data (e.g., aggregation logic), etc. In some cases, the input data can be retrieved by the API from a configuration file in the processing artifact retrieved by the feature management platform.

The stateful feature processing 206 component can implement the transforms (or feature calculation logic) defined for the stateful feature to transform the raw events 202 to feature data. For example, the raw events can be provided to the feature calculation logic based on the processing artifact that the API uses to define the pipeline for the stateful feature processing 206 component. The feature data generated by the stateful feature processing 206 component can be stored in a cache 208 (e.g., an aggregated state 116 as described in FIG. 1), external to the stateful feature processing 206 component.

The feature data may be stored in the cache 208 in order to retain feature data state over a period of time, such that the stateful feature processing 206 component can generate a stateful feature. For example, the stateful feature processing 206 component can implement the feature calculation logic (e.g., count, average, etc.) on the event data for a period of time based on the input data defining the stateful feature to generate feature data (or feature values). The period of time can be defined in the processing artifact and/or via a user interface as an aggregation time window.

For example, if raw events 202 are retrieved from a streaming data source, then to generate a stateful feature from a present time to a time in the future, the stateful feature processing 206 component can generate feature data and store the feature data in a cache 208 until the time in the future is reached to generate a stateful feature. Upon completing the generation of feature data for a period of time matching the aggregation time window, the feature data can be retrieved by the stateful feature processing 206 component from the cache 208. The stateful feature processing 206 component of the feature management platform can invoke the aggregation logic (as defined by the processing artifact) to generate a stateful feature.

Once the stateful feature is generated, the stateful feature processing 206 component can "push" or publish the stateful feature as a vector to the feature queue 210. In doing so, a computing device can receive the vector representing the stateful feature. In some cases, the computing device can generate a prediction (e.g., via the locally hosted model of the computing device) and transmit the prediction to the feature management platform. In such cases, the prediction can be processed by the stateful feature processing 206 component via the feature queue 210 to generate new stateful features (in accordance to the processing artifact that defines the stateful feature). The prediction can also be provided to other computing devices requesting the prediction via the feature queue 210.

Example Pipeline of the Feature Management Platform

Figure 3:
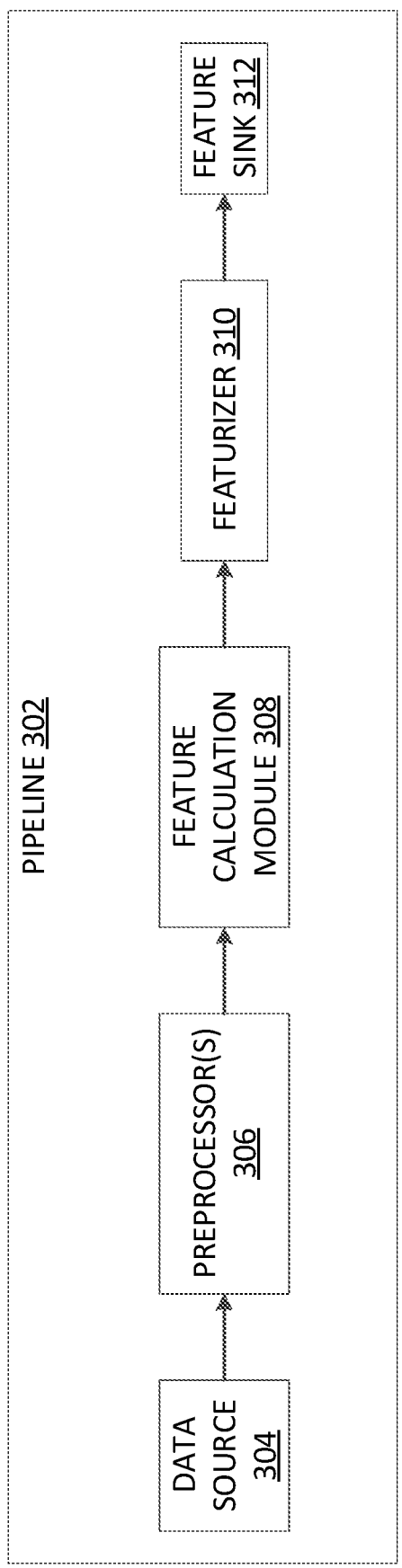
FIG. 3 depicts an example pipeline of the feature management platform, according to an embodiment.

FIG. 3 depicts an example pipeline 302 of the feature management platform. In some embodiments, the example pipeline 302 is part of the feature processing component of the feature management platform. The feature management platform includes a platform API for users to interact with the feature management platform. In some cases, the API is built on top of APACHE SPARK™ and can support Scala, SQL, and Python as interface languages.

The API of the feature management platform is an entry point for a computing device (e.g., via user interface(s)) and is responsible for the generation and execution of processing jobs via a pipeline 302. In some cases, the API defining the pipeline 302 can operate in either structured streaming or in batch mode. For example, the pipeline 302 can process event data from a streaming data source or a batch data source. The same API is offered to each computing device (e.g., via user interface(s)) and can backfill features. The API defines the pipeline 302 and includes a data source 304, preprocessor(s) 306, a feature calculation module 308, a featurizer 310, and a feature sink 312. In some cases, a user interface is provided by the API for each aspect of the pipeline to define the feature (e.g., data source 304, preprocessor(s) 306, a feature calculation module 308, a featurizer 310, and a feature sink 312). The API can be agnostic and implemented on different types of databases.

For example, the feature management platform can receive a processing artifact (e.g., a configuration file and/or code fragment). Based on the processing artifact received, the API of the feature management platform can define the pipeline 302 along with input received via the user interface(s) provided by the API to the computing device(s) for generating a stateful feature from event data. In some cases, the data source 304 (e.g., defined in the configuration file) retrieves event data for feature processing by the pipeline 302.

In some cases, the data source 304 as defined (e.g., in the configuration file) for the feature can include a batch data source and/or a streaming data source from which to retrieve data from to generate feature data. In such cases, the API of the feature management platform can generate a batch processing job and a real-time processing job. The batch processing job can be initiated first by the pipeline 302 to generate feature data for a defined period of time, up to the present time. Upon reaching the present time, the batch processing job can be completed, and the real-time processing job can be initiated. For example, the pipeline 302 can retrieve event data from a batch data source for the batch processing job and can retrieve event data from the streaming data source for the real-time processing job once the batch processing job is completed.

The data source 304 can include HIVE™, EBUS™, S3™, or other data sources capable of storing data. The preprocessor(s) 306 can be chained together or sequentially executed to filter out event data. For example, if click stream data regarding the "clicks" on a web page, link, etc. was retrieved from the data source 304, then the preprocessor(s) 306 can filter out (or remove) test data from the click stream data prior to calculation by the feature calculation module 308.

The feature calculation module 308 can perform operations (e.g., as defined by a user interface and/or configuration file). For example, the feature calculation module 308 can perform feature logic calculations and aggregation operations (e.g., a count, average, and other types of operation on event data and/or feature data). The feature calculation module 308 can implement the aggregation operation(s) as defined by the processing artifact to generate a stateful feature.

In some cases, the feature calculation module 308 can perform the calculation of event data in parallel in the pipeline. The feature calculation module 308 can generate a table of results, and the featurizer 310 can transform the table into a feature vector format. The featurizer 310, upon generating the feature vector by transforming the table results of the feature calculation module 308, can then push the feature vector to the feature sink 312. In some case, the feature sink 312 can be a feature queue of the feature management platform (e.g., a feature queue 106 as described in FIG. 1) that publishes the feature vector for a computing device.

Example Configuration File

FIG. 4 depicts an example configuration file 400. In one example, the configuration file 400 may be provided by a user via a computing device to the feature management platform. In such cases, the computing device provides the configuration file as part of a processing artifact (with a code fragment) when requesting a feature in cases where the feature management platform does not include the feature in the feature registry. For example, the computing device can generate the configuration file and transmit the configuration file as part of the processing artifact to the feature management platform.

The configuration file 400, along with code fragments, defines the feature requested as well as identifies the data source to retrieve event data and the type of transform to be applied to the event data. In some cases, the configuration file received from a computing device can be an object notation or data serialization configuration file format, such as a JSON file, a HOCON file, an XML, file, a YAML file, a ZIP file, a JAR file, and so forth.

In the depicted embodiment, the following data types are defined in configuration file 400: a "feature-name", "version" of the feature, "description" of the feature, source identification ("source-id"), "source-version", "tags", "authors", "owners", "watchers", "ttl-in-milli", "classification", "feature-value-data-type", "is-nullable", "start-execution", "is-test", "entity-key", "entity-value-column", "feature-value-column", "feature-space-name", "calculator", "is-aggregate", "governance-id-mapping", and "governance-exempted". In some cases, the definitions of the feature can include more than one value, such as "authors", "owners", and "watchers". For example, as depicted in the example configuration file 400, "authors" includes "jdoe" and "jsmith".

In some cases, the configuration file 400 of the processing artifact can define additional parameters specific to stateful featurization. For example, the configuration file can include a time parameter for the period of time associated with the stateful feature (e.g., a start time and end time for retrieving event data and generating feature data). In other cases, the configuration file of the processing artifact can include stateful feature data for generation other types of feature data (e.g., hierarchical features). For example, when the transformation by the feature management platform begins to consume feature outputs, as a result, other feature spaces (e.g., such as hierarchical features) can be defined as an input in the configuration file 400.

Figure 5:
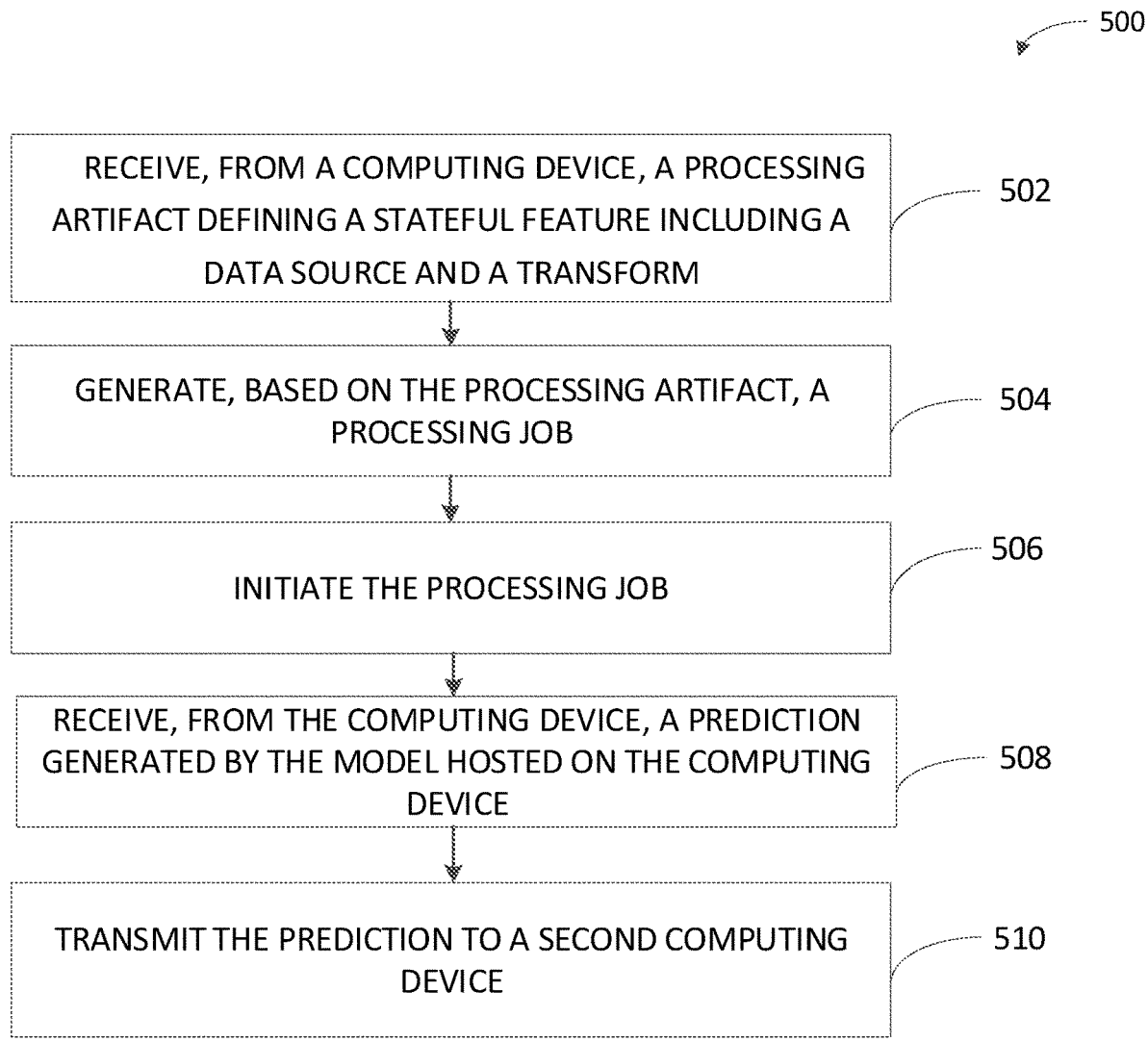
FIG. 5 depicts an example flow diagram of the feature management platform managing stateful features, according to an embodiment.

Example Flow Diagram of the Feature Management Platform Managing Stateful Features FIG. 5 depicts an example flow diagram 500 of the feature management platform managing a stateful feature.

At step 502, the feature management platform receives, from a computing device, a processing artifact defining a stateful feature including a data source from which to retrieve event data, a transform (e.g., feature calculation) to apply to the event data, and other parameters defining the stateful feature (e.g., a period of time). In some cases, the processing artifact can include a configuration file and/or code fragments in a file capable of storing the definition of the stateful feature.

The feature management platform can also receive via the processing artifact and/or user interfaces provided by the API input data for feature logic calculations and aggregation operations for generating the stateful feature. The input data can also include an aggregation time window for implementing the feature logic calculations in order to generate the stateful feature.

At step 504, the feature management platform generates, based on the processing artifact, a processing job (e.g., a pipeline). In some cases, the API of the feature management platform retrieves data from the processing artifact to define a pipeline that can generate the stateful feature as per the processing artifact. For example, an agnostic API can be implemented such that the API can retrieve data from any database and can interact with any computing device via the user interface provided by the API.

At step 506, the feature management platform initiates the processing job (e.g., via the pipeline of the feature management platform). The processing job initiated by the feature management platform to generate the stateful feature is further described in FIG. 6. As part of the processing job, in some cases, the feature management platform can provide the stateful feature to a computing device (e.g., the same computing device that provided the processing artifact or another computing device as directed by the processing artifact or as requested). In some cases, after receiving the stateful feature, the computing device can train a model with the stateful feature.

At step 508, the feature management platform receives, from the computing device, a prediction generated by the model hosted on the computing device. For example, in some cases, upon receiving the stateful feature from the feature management platform, a computing device can generate a prediction with the stateful feature.

At step 510, the feature management platform transmits the prediction to another computing device. For example, another computing device can request the same prediction generated by and received from the computing device as described at step 508. In some cases, the feature management platform can transmit the prediction to another model. Rather than having to expend unnecessary resources, the feature management platform can provide the prediction to the other computing device and/or model.

Figure 6:
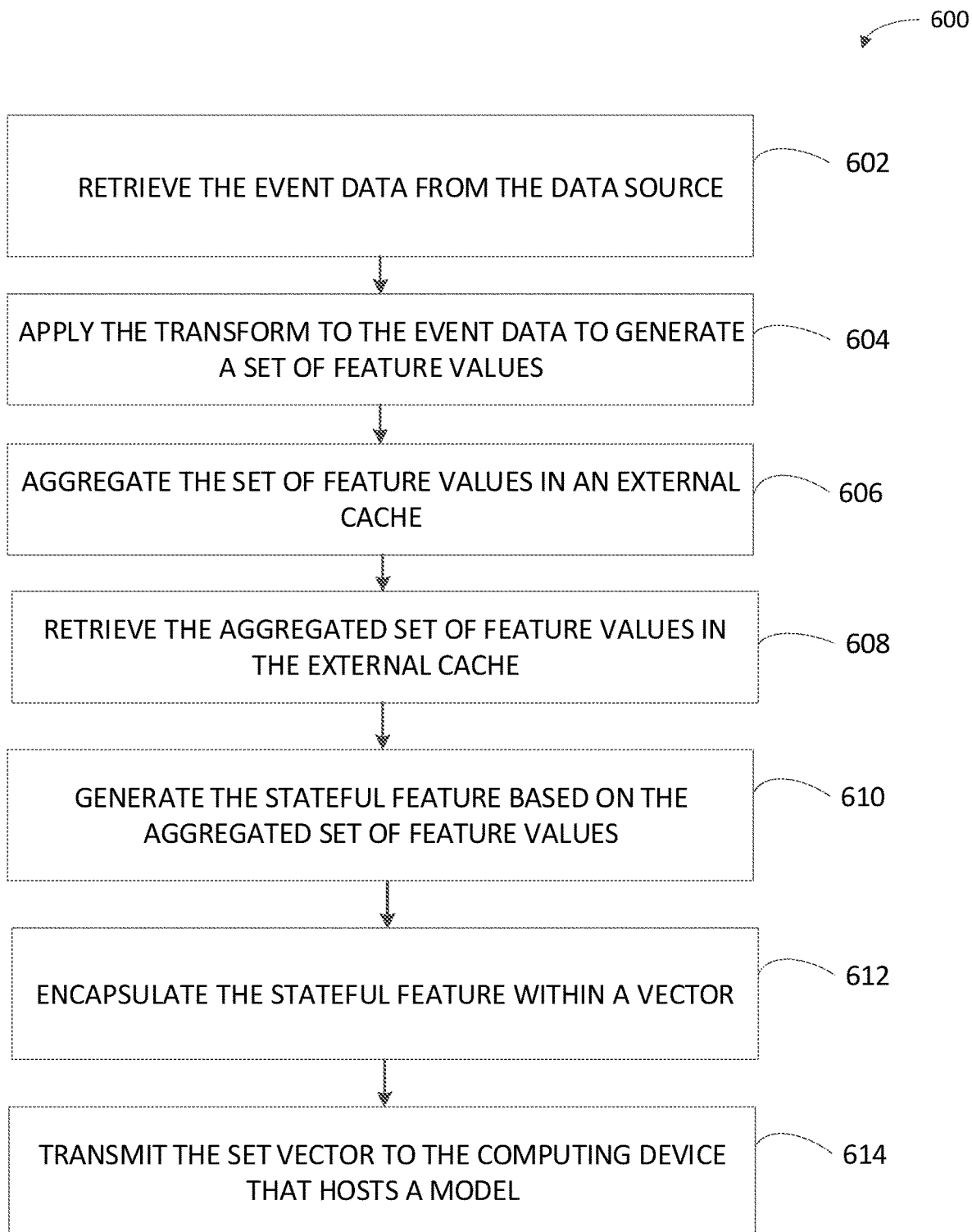
FIG. 6 depicts an example flow diagram of the feature management platform initiating a processing job, according to an embodiment.

Example Flow Diagram of the Feature Management Platform Initiating a Processing Job FIG. 6 depicts an example flow diagram 600 of the feature management platform initiating a processing job (e.g., via the pipeline defined by the API of the feature management platform).

At step 602, the feature management platform retrieves the event data from a data source. The event data can be retrieved from a streaming data source and/or a batch data source. In some cases, the event data can be stored in a raw event database (e.g., a raw event database 204 as described in FIG. 2) in the feature management platform. In such cases, the feature management platform can retrieve the event data from the raw event database, according to the processing artifact defining a time period associated with the stateful feature.

At step 604, the feature management platform applies the transform to the event data to generate a set of feature values. For example, in the pipeline, the preprocessors can filter the event data retrieved from the data source(s) (e.g., to remove test data, duplicate data, etc.). The preprocessors can be executed sequentially. Upon implementing the preprocessors, a feature calculation module applies the transform(s) to the event data. The transforms (or feature logic operations) can be defined by the processing artifact. The feature calculation module can execute the transforms in parallel on the event data to generate feature values.

At step 606, the feature management platform can aggregate the set of feature values in a cache. The feature values can be stored in a cache external to the pipeline in the feature management platform. In such cases, the stateful feature defined can include feature values not yet calculated so the cache can store the feature values until the remaining feature values are calculated (e.g., a designated time is reached for calculating the stateful feature).

For example, the stateful feature can be defined from the present time to a time in the future. In another example, the stateful feature can be defined by a time in the past up to the present. In such cases, the feature management platform can retrieve event data to backfill feature values for a time in the past. The feature management platform can process and generate feature values that are stored in the cache until reaching the designated time.

Upon reaching the designated time, at step 608, the feature management platform can retrieve aggregated feature data from the cache, and at step 610, the feature management platform can generate the stateful feature. The stateful feature can be generated based on aggregated feature data retrieved and the stateful feature operations (e.g., aggregation operations) defined in the processing artifact. For example, the processing artifact can define the aggregation operations. The API of the feature management platform can retrieve the aggregation operations and implement the aggregation operations via the pipeline.

At step 612, the feature management platform can encapsulate the stateful feature in a vector. For example, the featurizer of the pipeline in the feature management platform can transform the generated stateful feature data into a vector representing the stateful feature.

At step 614, the feature management platform can transmit the vector to a computing device. In some cases, the computing device can use the vector to train a model or generate a prediction by a trained model that is locally hosted on the computing device.

Example Server for the Feature Management Platform

Figure 7:
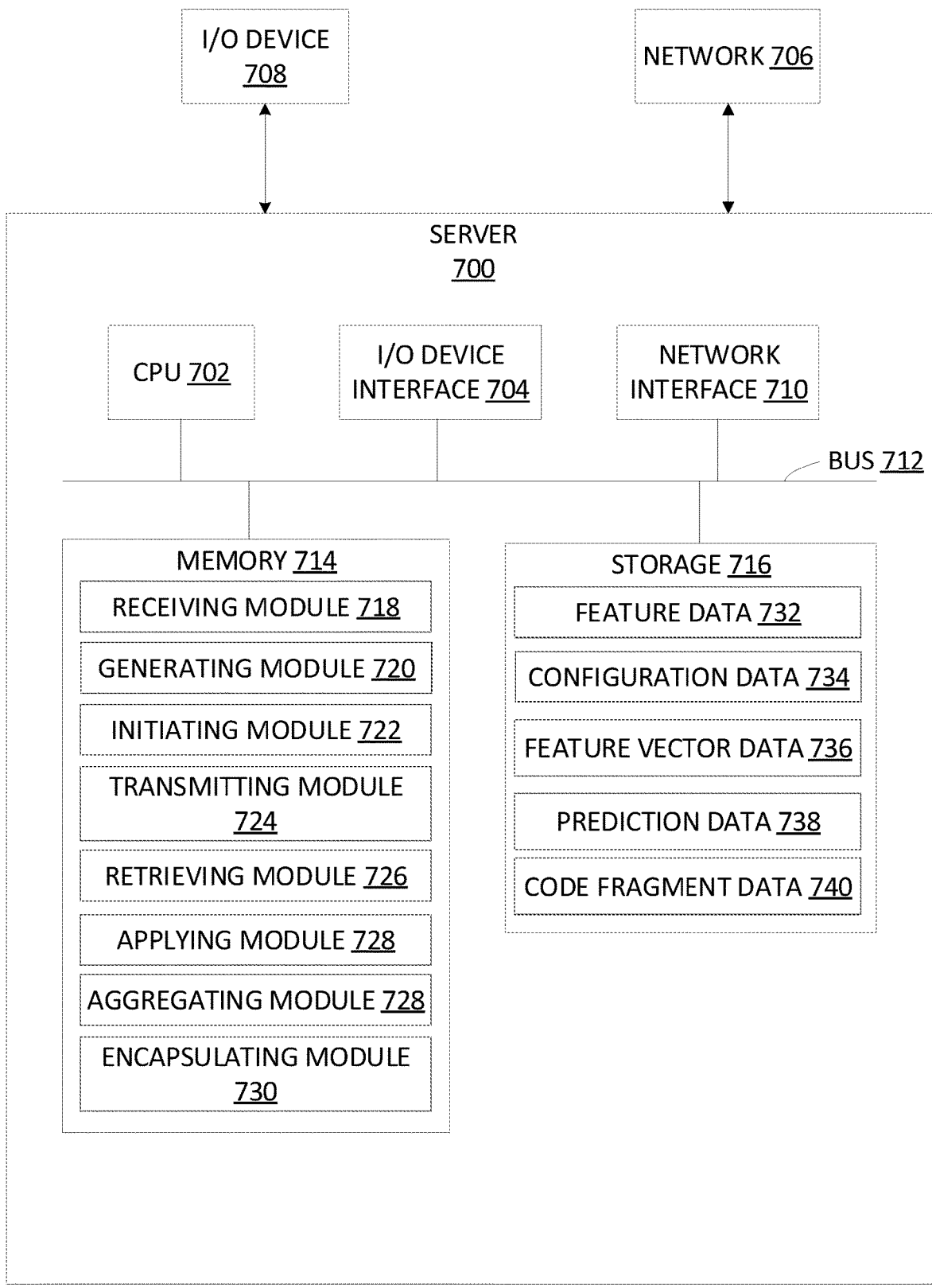
FIG. 7 depicts an example server for the feature management platform, according to an embodiment.

FIG. 7 depicts an example server 700 that may perform the methods described herein, for example, with respect to FIGS. 1-6. For example, the server 700 can be a physical server or a virtual (e.g., cloud) server and is not limited to a single server that performs the methods described herein, for example, with respect to FIGS. 1-6.

Server 700 includes a central processing unit (CPU) 702 connected to a data bus 712. CPU 702 is configured to process computer-executable instructions, e.g., stored in memory 714 or storage 716, and to cause the server 700 to perform methods described herein, for example with respect to FIGS. 1-6. CPU 702 is included to be representative of a single CPU, multiple CPUs, a single CPU having multiple processing cores, and other forms of processing architecture capable of executing computer-executable instructions.

Server 700 further includes input/output (I/O) device(s) 708 and interfaces 704, which allows server 700 to interface with input/output devices 708, such as, for example, keyboards, displays, mouse devices, pen input, and other devices that allow for interaction with server 700. Note that server 700 may connect with external I/O devices through physical and wireless connections (e.g., an external display device).

Server 700 further includes network interface 710, which provides server 700 with access to external network 706 and thereby external computing devices.

Server 700 further includes memory 714, which in this example includes a receiving module 718, a generating module 720, an initiating module 722, a transmitting module 724, a retrieving module 726, an applying module 728, an aggregating module 728, an encapsulating module 730 for performing operations described in FIGS. 1-6.

Note that while shown as a single memory 714 in FIG. 7 for simplicity, the various aspects stored in memory 714 may be stored in different physical memories, but all accessible by CPU 702 via internal data connections such as bus 712.

Storage 716 further includes feature data 732, which may be like the stateful feature generated based on implementing aggregation operations, feature data (or feature values) generated by implementing feature logic calculations, and feature metadata as described in FIGS. 1-6.

Storage 716 further includes configuration data 734, which may include the configuration file (e.g., zip or jar files), as described in FIGS. 1-6.

Storage 716 further includes feature vector data 734, which may include vectors representing stateful features, as described in FIGS. 1-6.

Storage 716 further includes prediction data 736, which may include prediction(s) received from a computing device that locally implemented a model with stateful features (e.g., vectors) received from the feature management platform, as described in FIGS. 1-6.

Storage 716 further includes code fragment data 738, which may include code fragment data that is received by the feature management platform (e.g., with the configuration file), as described in FIGS. 1-6.

While not depicted in FIG. 7, other aspects may be included in storage 716.

As with memory 714, a single storage 716 is depicted in FIG. 7 for simplicity, but various aspects stored in storage 716 may be stored in different physical storages, but all accessible to CPU 702 via internal data connections, such as bus 712, or external connection, such as network interfaces 704. One of skill in the art will appreciate that one or more elements of server 700 may be located remotely and accessed via a network 706.

Figure 8:
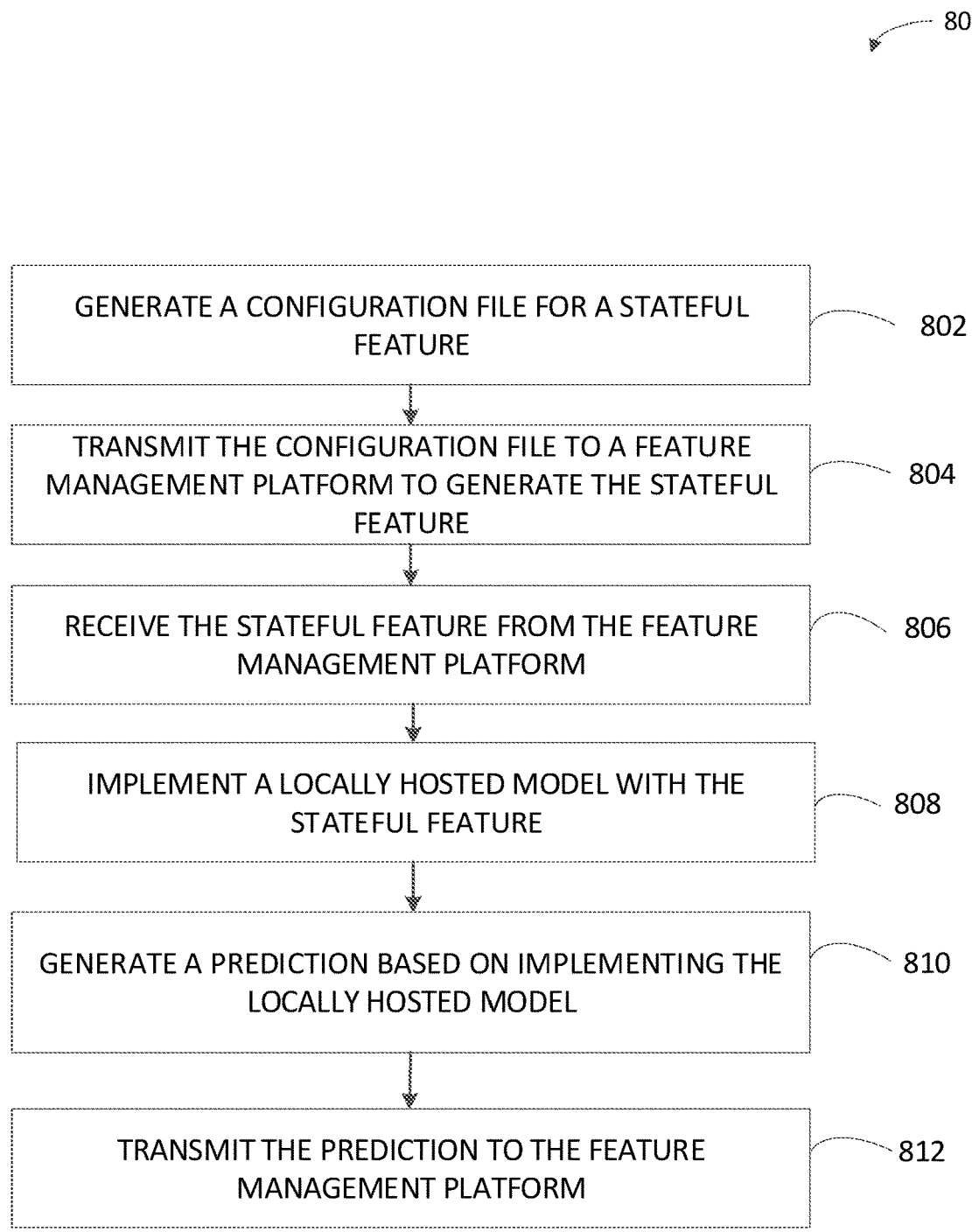
FIG. 8 depicts an example flow diagram of a computing device interacting with a feature management platform, according to an embodiment.

Example Method of a Computing Device Interacting with a Feature Management Platform FIG. 8 depicts an example method 800 of a computing device interacting with a feature management platform, as described with respect to FIG. 1.

At step 802, the computing device generates a configuration file. The configuration file can define a stateful feature for the feature management platform, including a data source to retrieve event data from, the type of transform (or calculation) to perform on the event data, etc.

For example, the configuration file can be an object notation or data serialization configuration file format, such as a JSON file, a HOCON file, an XML file, a YAML file, a ZIP file, a JAR file, and so forth. In some cases, the computing device generates code fragments to include with the configuration file. The code fragments can include context data of the stateful feature to be generated. In some cases, the feature management platform may have received the code fragment previously from another computing device.

At step 804, the computing device transmits the configuration file to a feature management platform to generate the stateful feature. In the instance that code fragments are generated, the computing device can transmit the code fragments with the configuration file as part of a processing artifact.

At step 806, the computing device can receive the stateful feature from the feature management platform. In some cases, the computing device that transmitted the configuration file (and the code fragments) can receive the stateful feature. In other cases, the computing device that transmitted the configuration file (and the code fragments) can direct the feature management platform to transmit the feature to either the same computing device or another computing device. In some cases, the feature received from the feature management platform can be a single vector message that includes a feature vector representing the stateful feature.

At step 808, the computing device implements a locally hosted model with the stateful feature. In some cases, a computing device can use the stateful feature received from the feature management platform to generate a prediction. In other cases, the computing device can use the feature to train a locally hosted model.

At step 810, the computing device generates a prediction with the vector based on implementing the locally hosted model.

At step 812, the computing device transmits the prediction generated to the feature management platform. In some cases, a different computing device and/or model can request the same prediction transmitted at step 812. In such cases, the feature management platform can transmit the prediction to the different computing device and/or model, without having to expend additional resources to generate the prediction.

Example Computing Device

Figure 9:
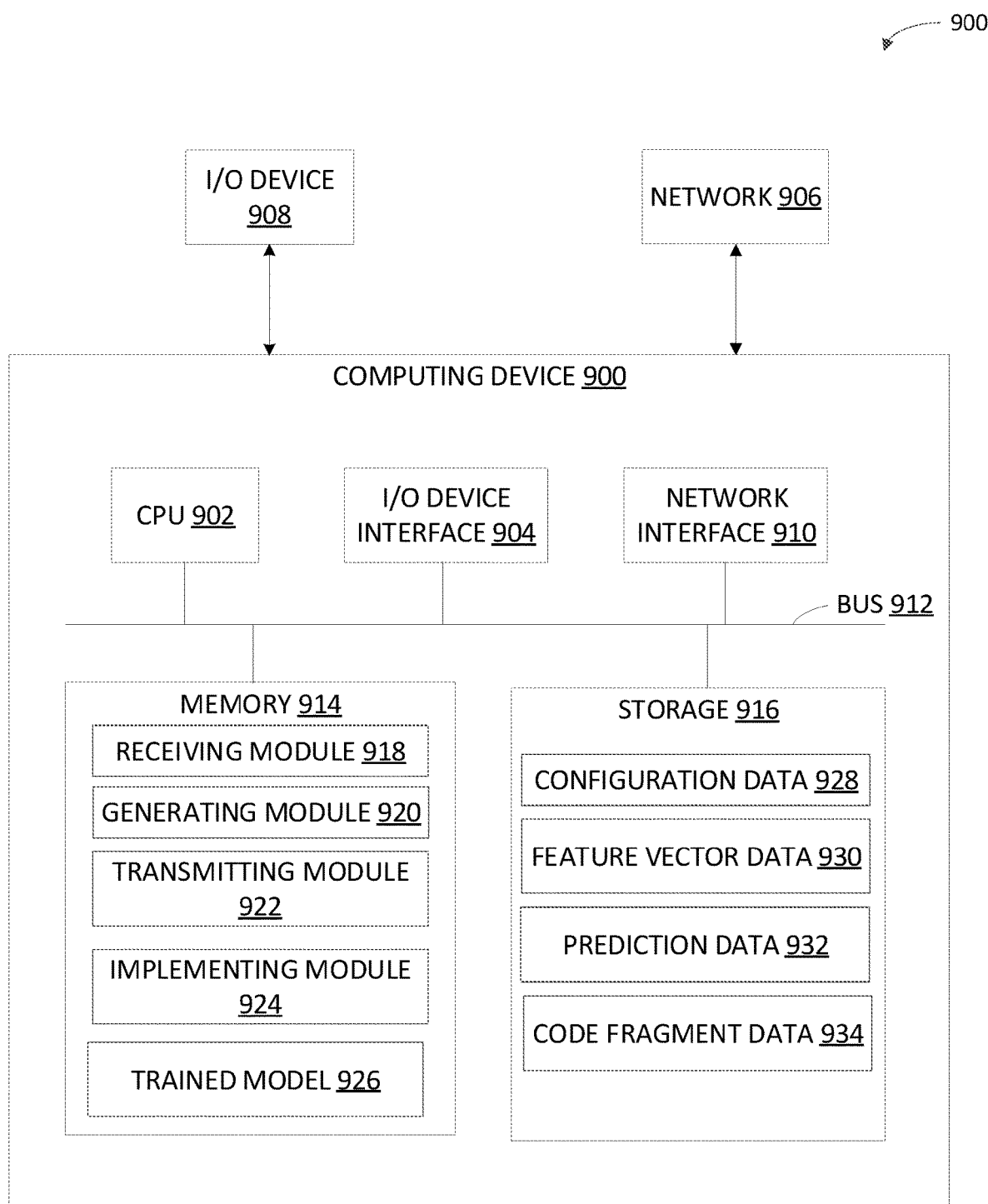
FIG. 9 depicts an example computing device, according to an embodiment.

FIG. 9 depicts an example computing device 900 that may perform the methods described herein, for example, with respect to FIGS. 1, 8. For example, the computing device 900 can be a computer, laptop, tablet, smartphone, a virtual machine, container, or other computing device with the same or similar capabilities (e.g., that includes training and implementing models, serving predictions to applications running on such computing device, and interacting with the feature management platform). The methods described herein, for example, with respect to FIGS. 1, 8 can be performed by one or more computing devices 900 connected to the feature management platform.

Computing device 900 includes a central processing unit (CPU) 902 connected to a data bus 912. CPU 902 is configured to process computer-executable instructions, e.g., stored in memory 914 or storage 916, and to cause the computing device 900 to perform methods described herein, for example with respect to FIGS. 1, 8. CPU 902 is included to be representative of a single CPU, multiple CPUs, a single CPU having multiple processing cores, and other forms of processing architecture capable of executing computer-executable instructions.

Computing device 900 further includes input/output (I/O) device(s) 908 and interfaces 904, which allows computing device 900 to interface with input/output devices 908, such as, for example, keyboards, displays, mouse devices, pen input, and other devices that allow for interaction with computing device 900. Note that computing device 900 may connect with external I/O devices through physical and wireless connections (e.g., an external di splay device).

Computing device 900 further includes network interface 910, which provides computing device 900 with access to external network 906 and thereby external computing devices.

Computing device 900 further includes memory 914, which in this example includes a receiving module 918, a generating module 920, a transmitting module 922, an implementing module 924, and a trained model 926 for performing operations described in FIGS. 1, 8.

Note that while shown as a single memory 914 in FIG. 9 for simplicity, the various aspects stored in memory 914 may be stored in different physical memories, but all accessible by CPU 902 via internal data connections such as bus 912.

Storage 916 further includes configuration data 928, which may be like the configuration file (e.g., zip or jar files), as described in FIGS. 1, 8.

Storage 916 further includes feature vector data 930, which may include the vector representing the stateful feature, as described in FIGS. 1, 8.

Storage 916 further includes prediction data 932, which may include prediction(s) generated by a computing device that locally implemented a model with stateful features (e.g., vectors) received from the feature management platform, as described in FIGS. 1, 8.

Storage 916 further includes code fragment data 934, which may include code fragment data that is generated by the computing device and provided to the feature management platform, as described in FIGS. 1-6, 9.

While not depicted in FIG. 9, other aspects may be included in storage 916.

As with memory 914, a single storage 916 is depicted in FIG. 9 for simplicity, but various aspects stored in storage 916 may be stored in different physical storages, but all accessible to CPU 902 via internal data connections, such as bus 912, or external connection, such as network interfaces 904. One of skill in the art will appreciate that one or more elements of computing device 900 may be located remotely and accessed via a network 906.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving, from a computing device, a processing artifact defining a stateful feature including:
   a data source to retrieve event data; and
   a transform to apply to the event data from the data source;
   generating, based on the processing artifact, a processing job;
   initiating the processing job, wherein the processing job includes:
   retrieving the event data from the data source;
   applying the transform to the event data to generate a set of feature values;
   generating a stateful feature based on the set of feature values;
   providing the stateful feature to the computing device; and
   registering the stateful feature and associated metadata in a feature registry;
   receiving, from an additional computing device, a request for the stateful feature;

determining, based on locating the stateful feature in the feature registry using the associated metadata, not to re-generate the stateful feature in response to the request; and providing, to the additional computing device, the stateful feature in response to the request.

2. The method of claim 1, further comprising backfilling an external cache with the set of feature values to generate the stateful feature.

3. The method of claim 1, further comprising providing a user interface via an API to the computing device to define the stateful feature.

4. The method of claim 1, further comprising storing the set of feature values in an external cache.

5. The method of claim 1, wherein aggregating the set of feature values is based on input data from the computing device.

6. The method of claim 1, further comprising receiving a configuration file from the computing device.

7. The method of claim 6, wherein the configuration file includes input data defining the stateful feature.

8. The method of claim 7, wherein the input data includes an aggregation operation for generating the stateful feature.

9. A system comprising:
one or more processors; and
a memory storing instructions that, when executed by the one or more processors, cause the system to:
receive, from a computing device, a processing artifact defining a stateful feature including:
  a data source to retrieve event data; and
  a transform to apply to the event data from the data source;
generate, based on the processing artifact, a processing job;
initiate the processing job, wherein the processing job includes:
  retrieving the event data from the data source;
  applying the transform to the event data to generate a set of feature values;
  generating a stateful feature based on the set of feature values;
  providing the stateful feature to the computing device; and
  registering the stateful feature and associated metadata in a feature registry;
receive, from an additional computing device, a request for the stateful feature;
determine, based on locating the stateful feature in the feature registry using the associated metadata, not to re-generate the stateful feature in response to the request; and
provide, to the additional computing device, the stateful feature in response to the request.

10. The system of claim 9, wherein the instructions, when executed by the one or more processors, further cause the system to backfill an external cache with the set of feature values to generate the stateful feature.

11. The system of claim 9, wherein the instructions, when executed by the one or more processors, further cause the system to provide a user interface via an API to the computing device to define the stateful feature.

12. The system of claim 9, wherein the instructions, when executed by the one or more processors, further cause the system to store the set of feature values in an external cache.

13. The system of claim 9, wherein aggregating the set of feature values is based on input data from the computing device.

14. The system of claim 9, wherein the instructions, when executed by the one or more processors, further cause the system to receive a configuration file from the computing device.

15. The system of claim 14, wherein the configuration file includes input data defining the stateful feature.

16. The system of claim 15, wherein the input data includes an aggregation operation for generating the stateful feature.

17. A method, comprising:
retrieving, at a feature management platform, a raw event from a streaming data source;
providing the raw event to a feature calculation logic of the feature management platform;
implementing the feature calculation logic on the raw event for a period of time matching a size of an aggregation time window to create a set of feature values;
generating a stateful feature based on the set of feature values;
registering the stateful feature and associated metadata in a feature registry;
receiving, from a computing device, a request for the stateful feature;
determining, based on locating the stateful feature in the feature registry using the associated metadata, not to re-generate the stateful feature in response to the request; and
providing, to the computing device, the stateful feature in response to the request.

18. The method of claim 17, further comprising providing a set of user interfaces to collect input data defining a stateful feature.

19. The method of claim 18, wherein the input data collected by a user interface in the set of user interfaces comprises:
the size of the aggregation time window; and
the feature calculation logic.

20. The method of claim 17, further comprising: publishing the stateful feature in a feature queue.

* * * * *